J. K. STEWART.
MAGNETIC SPEEDOMETER.
APPLICATION FILED JUNE 4, 1912.
1,054,997.
Patented Mar. 4, 1913.
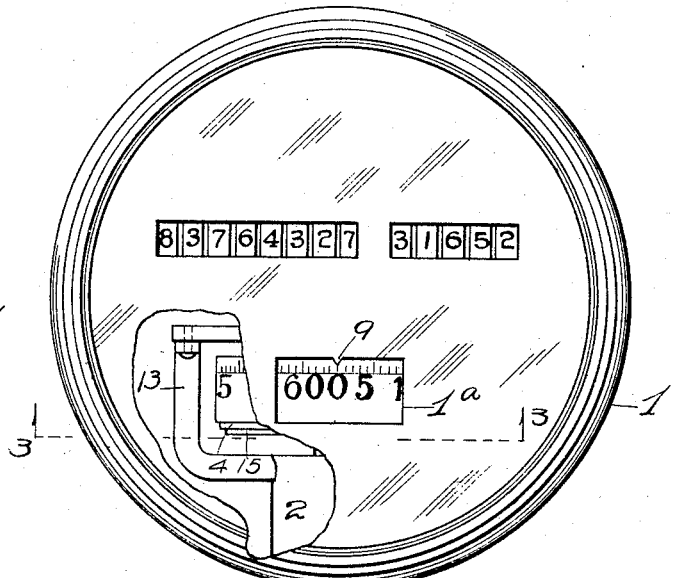
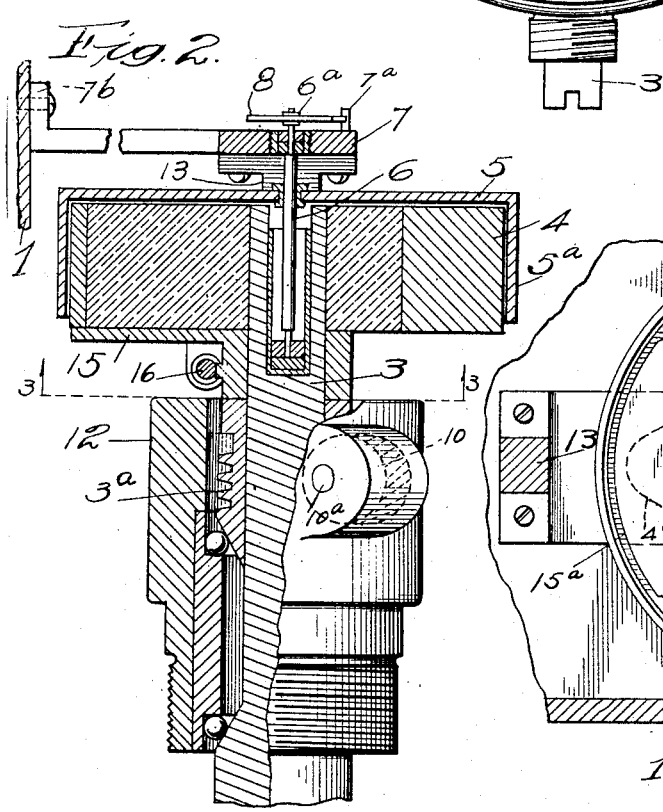
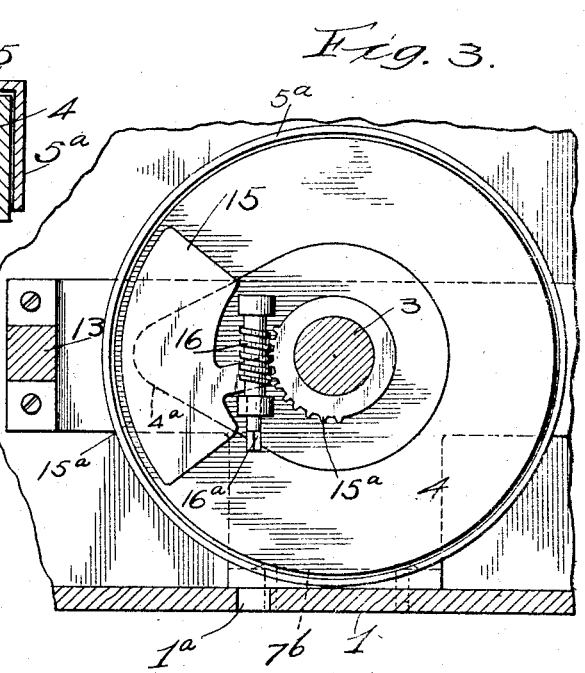
Witnesses.
O. F. Plumtree
Lucy I. Stone
Inventor
John K. Stewart.
by Burton & Burton
his Atty's

UNITED STATES PATENT OFFICE.

JOHN K. STEWART, OF CHICAGO, ILLINOIS, ASSIGNOR TO STEWART-WARNER SPEEDOMETER CORPORATION, OF THE STATE OF VIRGINIA.

MAGNETIC SPEEDOMETER.

1,054,997.  Specification of Letters Patent.  Patented Mar. 4, 1913.

Application filed June 4, 1912. Serial No. 701,695.

*To all whom it may concern:*

Be it known that I, JOHN K. STEWART, a citizen of the United States, residing at Chicago, in the county of Cook and State of Illinois, have invented new and useful Improvements in Magnetic Speedometers, of which the following is a specification, reference being had to the accompanying drawings, forming a part thereof.

The purpose of this invention is to provide an improved construction of a magnetic speedometer having improved means for calibrating and for compensating for errors due to temperature changes.

It consists in the elements and features of construction shown and described as indicated in the claims.

In the drawings:—Figure 1 is a front elevation of an instrument embodying this invention. Fig. 2 is a section of the same, axial with respect to the rotating magnet. Fig. 3 is a section at the line 3—3 on Figs. 1 and 2.

The instrument shown in the drawing comprises a casing, 1, in the form of a cup, within which there is rigidly mounted a frame structure, 2, which carries the rotating shaft, 3, which extends through the bearing to the outside of the casing and within the casing carries a magnet, 4, preferably in the form of a completely closed ring. A drag disk, 5, is mounted on a spindle, 6, which is stepped in a bearing provided in the shaft, 3, which is axially bored to receive such step bearing. The disk, 5, is positioned at a slight distance from the upper face of the magnet and has a cylindrical flange or petticoat, 5$^a$, depending so as to encompass the magnet, and having on its outer surface a graduated scale which is exposed through an aperture or window, 1$^a$, in the casing. A plate, 7, rigid with the interior frame, 2, and with the casing is mounted above the disk, 5, at a short distance therefrom. The spindle, 6, extends through and obtains bearing in the plate, 7, and above the plate a helical hair spring, 8, has its inner end secured to a collet, 6$^a$, on the spindle, and its outer end to a post, 7$^a$, on the plate, whereby the spring is adapted to bias the disk to a position for exposing the zero mark of the scale at the index finger or pointer, 9, positioned on the case at the middle of the window, 1$^a$. The instrument illustrated is designed to contain also an odometer train, not shown, which derives its motion from the shaft, 3; and the shaft for that purpose has fast on it a twist gear, 3$^a$, which meshes with the twist gear, 10, on a shaft, 10$^a$, which is the initial shaft of the odometer train, the remainder of which is not shown.

The interior frame structure, 2, comprises a sleeve and housing, 12, which carries ball bearings for the shaft, 3, and a housing for the worm, 3$^a$, and pinion, 10, and from said housing, arms, 13, extending up to carry the plate, 7, which has at its rear edge a flange, 7$^b$, by which it is secured rigidly to the bottom or back plate of the cup, thus securing the said interior frame rigidly in the cup with the portion which contains the bearing for the shaft, 3, protruding out through the wall of the cup at the lower side, which is apertured for that purpose.

The magnet shown in this instrument is preferably in the form of a ring, reduced in thickness for a portion of its circumference at one side, as seen in Fig. 3.

For the purpose of conveniently calibrating the instrument and providing means by which correction may be made of errors arising from any cause affecting the drag of the magnet on the drag disk, there is mounted on the magnet carrier so as to be rotated with the magnet a soft iron member, 15, which comprises a segmental portion, 15$^a$, extending through a sufficient arc to adapt it to lap across the recess or eccentric portion, 4$^a$, of the central aperture of the magnet, the presence of which produces the thinning of the magnet ring at one side. This segment resting in contact with the side of the magnet ring operates as a shunt to deflect some portion of the flux which would otherwise pass in lines which would be cut by the drag disk, 5, either in the path circumferential with respect to the magnet, or in the path at the side of the magnet opposite that at which said shunt is positioned. This shunt device is rotatively mounted on the magnet carrier so that it can be shifted through a limited angle to cause the lap of the opposite ends of the segment upon the magnet at the opposite sides of said eccentric portion of the magnet aperture to be equal or to vary. When the lap is equal, the maximum amount of flux passes through the shunt and causes the maximum diminution of the drag. As the shunt is adjusted to render the lap unequal, the amount of flux taken by the shunt diminishes and the drag is correspondingly increased as said inequality increases. For adjusting this shunt it is provided with a worm gear segment, 15^b, which is engaged by a worm, 16, journaled on the magnet carrier and having its shaft, 16^a, accessible through an aperture, 1^a, in the casing through which said shaft may be reached by a key of suitable form to engage its exposed end to rotate it and thereby adjust the shunt.

I claim:—

1. In combination with a magnet and a magnetic drag element, one of said parts mounted for rotation and the other for oscillation, and means for biasing the latter to a normal position of rest; a magnet shunt mounted upon the magnet extending proximate to both poles thereof, and means for moving such shunt to vary the extent of its lap on the poles, respectively.

2. In combination with a magnet of ring form, reduced in thickness between the poles, and a non-magnetic drag element in the form of a cup having its bottom proximate to one side of the magnet and its cylindrical wall encompassing the same, one of said parts mounted for rotation about the axis of the magnet, and the other for oscillation about the same axis, and means for biasing the latter to a normal position of rest; a magnetic support, a magnetic shunt device mounted thereon, extending proximate to both poles of the magnet at the side of the latter opposite the bottom of the drag cup, and means for adjusting said shunt device about the magnet axis to vary the extent of its lap opposite the magnet poles, respectively.

3. In combination with means for producing a rotating magnetic field, comprising a magnet of ring-form mounted for rotation about its axis, in combination with a non-magnetic drag disk mounted for oscillation about the axis of the magnet; means for biasing said disk to a normal position of rest, and a magnetic shunt mounted upon the magnet in contact with both poles thereof, and means for turning the shunt about the magnet axis to vary the extent of its contact with the poles respectively.

4. In combination with means for producing a rotating magnetic field, comprising a magnet in ring-form reduced in thickness between the poles and mounted for rotation about its axis; a non-magnetic drag element in the form of a cup having its bottom proximate to one side of the magnet and its cylindrical wall encompassing the same and mounted for oscillation about the magnet axis; means for biasing such drag element to a normal position of rest; a magnetic shunt device mounted for rotation with the magnet and extending in contact with both poles of the magnet at the side thereof opposite the bottom of the drag cup, and means for adjusting said shunt device about the magnet axis to vary the extent of its contact with the magnet poles respectively.

In testimony whereof, I have hereunto set my hand, at Chicago, Illinois, this 16th day of May, 1912.

JOHN K. STEWART.

Witnesses:
STANHOPE HUDSON,
EDW. M. NIELSEN.